J. W. LEDOUX.
LIQUID METER.
APPLICATION FILED MAR. 4, 1907.

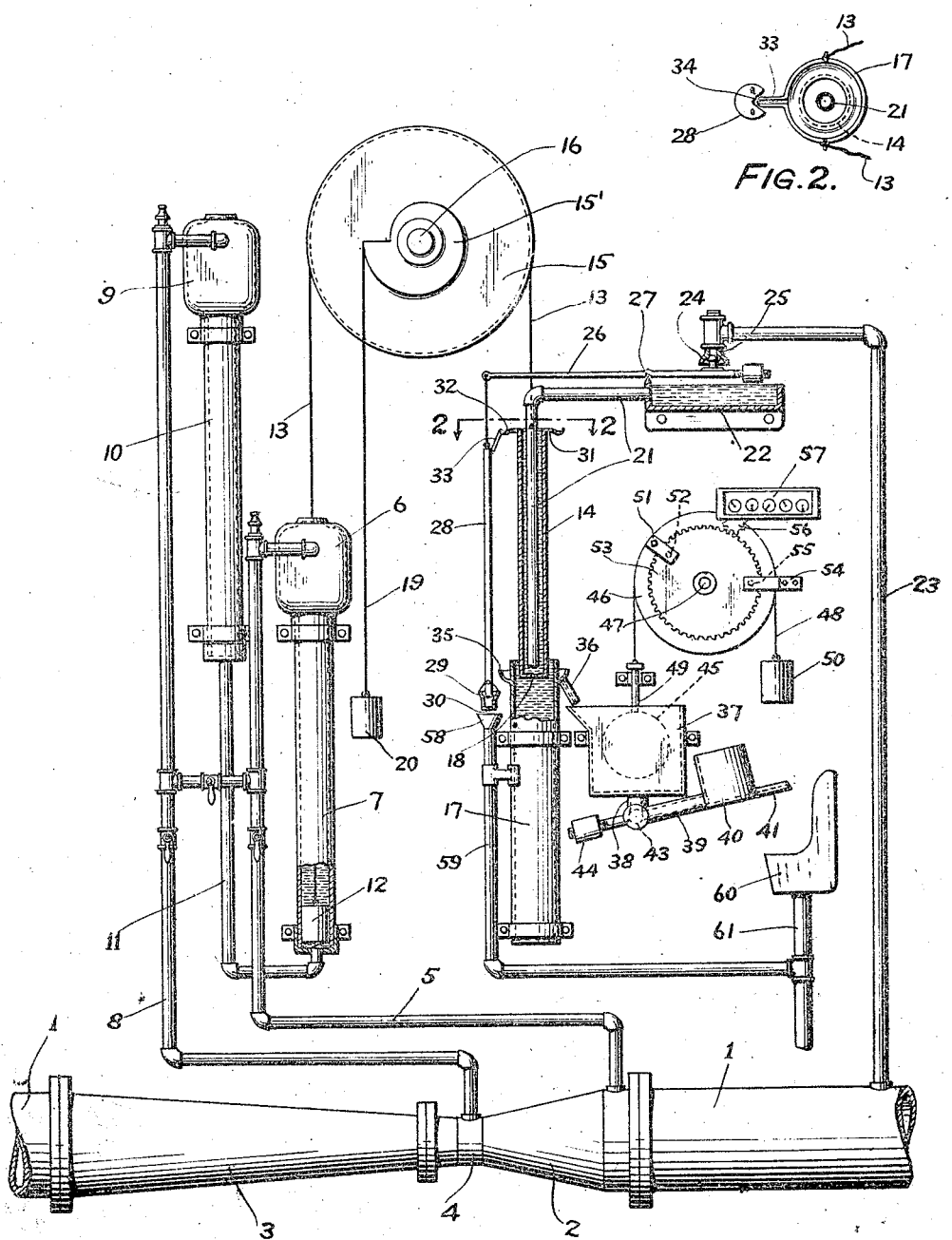

956,375.

Patented Apr. 26, 1910.
2 SHEETS—SHEET 2.

WITNESSES:
Robt R Kitchel
Jos. S. Denny Jr

INVENTOR
Jno. W. Ledoux
BY
Chas. N. Butler
ATTORNEY.

UNITED STATES PATENT OFFICE.

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

LIQUID-METER.

956,375.        Specification of Letters Patent.        Patented Apr. 26, 1910.

Application filed March 4, 1907. Serial No. 360,358.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

This invention is a meter having means whereby varying degrees of pressure corresponding to the varying rate of the flow to be determined maintains a proportionate flow of a small quantity of liquid which is measured, the proportionate flow being maintained by automatically varying the head of liquid flowing through a small orifice with variations in the head that induces the main flow.

The characteristic features of the invention are more fully disclosed by the following description and the accompanying drawings in illustration thereof, of which—

Figure 3:
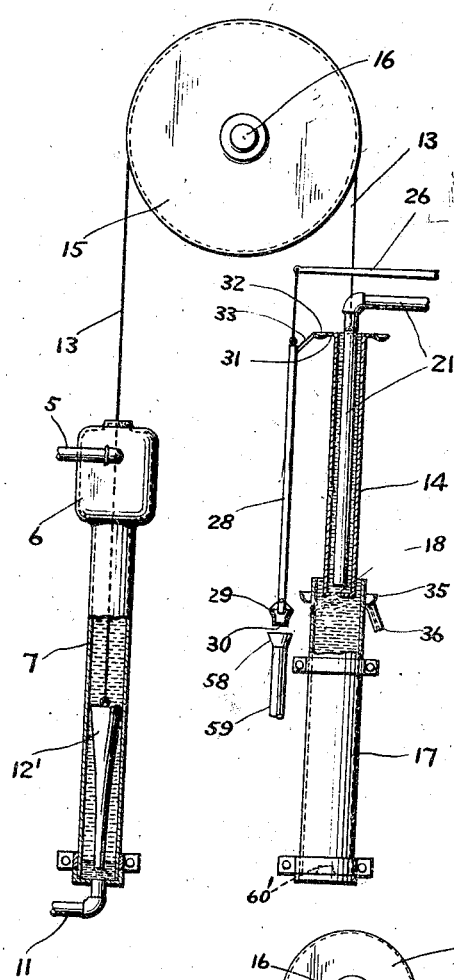
Figure 4:
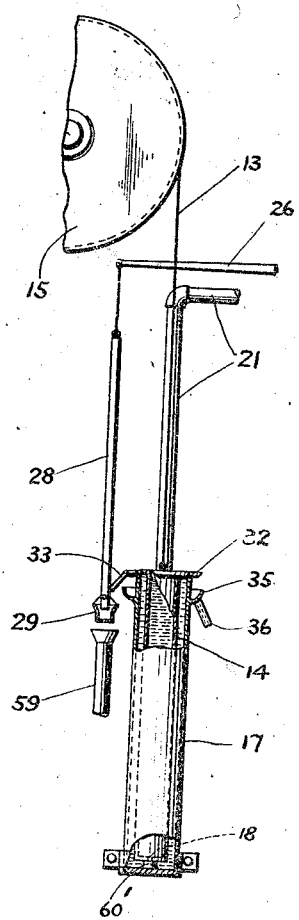
Figure 5:
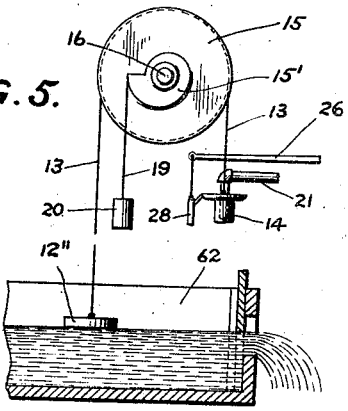

Figure 1 is an elevational view representing my invention with parts shown in section; Fig. 2 is a plan view of a detail taken on the line 2—2 of Fig. 1; Fig. 3 is an elevational view representing a second form of my invention with parts shown in section; Fig. 4 is an elevational view representing a second position of the mechanism shown in Fig. 3 with parts shown in section, and Fig. 5 represents the application of the invention to liquid flowing in an open channel.

In the practice of my invention, the conduit 1, which carries the fluid to be metered, is provided with the sections 2 and 3 converging to the throat 4. A tube 5 connects a normal section of the conduit 1 with the enlarged top or chamber 6 of a tubular reservoir 7 and a tube 8 connects the throat 4 with the enlarged top or chamber 9 of the tubular reservoir 10, the bottoms of the reservoirs being connected by the bent tube 11 and the tops of the chambers 6 and 9 being closed. A liquid, as mercury, heavier than that to be measured, as water, is contained in the parts 7, 10 and 11, forming barometric columns, subject to the pressure of the liquid in the conduit 1 acting through the tubes 5 and 8 upon the surfaces of the columns of heavier liquid, the tops of the chambers 6 and 9 being closed. The level of the heavier liquid, when the pressure upon the two columns is the same, is suitably near the bottom of the chamber 6, and the chambers 6 and 9 are made sufficiently large so that the heavier liquid will not under abnormal conditions overflow into the tubes 5 or 8.

As shown in Fig. 1, a float 12 is contained in the reservoir 7 and connected by a fine cord or wire 13 with a tubular vessel 14, the cord passing through the closed top of the chamber 6 and over a sheave 15 revoluble on an axis 16 to provide balancing means. The vessel 14 is adapted for reciprocation in the stationary tubular vessel 17, the former having a small orifice 18 in its bottom whereby liquid, with which it is maintained constantly full, flows into the latter, which is maintained constantly full thereby. The float 12 reciprocates with the rise and fall of the liquid in the reservoir 7. To maintain a balance between this float and the loaded vessel 14, subject to varying buoyancies at its varying positions in the filled vessel 17, a cam 15′ is fixed to the sheave 15 and carries a cord 19 having a weight 20 fixed thereto, the cam providing an arm for the weight variable with the buoyancy of the vessel 14. The vessel 14 is kept full by a pipe 21 connected with a basin 22 into which liquid flows from the conduit 1 by the pipe 23.

An automatic regulation of the flow of liquid to the basin 22 is effected so that there may be no unnecessary waste. To this end the discharge port 24 of the pipe 23 is controlled by a valve 25 carried by a lever 26 which is fulcrumed on the bearing 27 and supports a channeled rod 28 having suspended from the lower end thereof a bucket 29 with a small orifice 30 in its bottom. The vessel 14 overflows its very thin top flange 31 into the channel 32 which discharges by the small spout 33 into the channel 34 of the rod 28, the latter discharging into the bucket 29 which wastes through the orifice 30. When the liquid overflows the vessel 14 more rapidly than it can be discharged through the orifice 30, the consequent accumulation in the bucket 29 causes the latter to fall and elevates the valve 25, the flow from the pipe 23 being thereby checked. When the liquid overflows the vessel 14 less rapidly than the discharge from the bucket 29, the latter becomes lighter, rises, and opens the valve 25.

As the elevation of the vessel 14, or the difference between the levels of the liquids in the vessels 14 and 17, determines the pressure inducing flow through the orifice 18 and as this pressure is proportionate to the difference in pressure between the normal and reduced sections of the conduit 1, which determines the movement of the float 12, the quantity of liquid discharged from the orifice and received by the vessel 17 is proportionate to the flow through the conduit 1.

The liquid received by the vessel 17 overflows into a channel 35 which discharges by a spout 36 into a stationary tank 37. This tank discharges through the bottom thereof by a passage 38 connected with a passage 39 discharging into a vessel 40, which discharges in its turn by a passage 41 smaller than the passages 38 and 39. The passage 39, the vessel 40 and the passage 41 constitute parts of a lever having the flexible joint 43 about which it oscillates so that the vessel 40 will be held elevated by the counterweight 44 until the liquid has risen to a certain height in the tank 37 and will drop when filled by the discharge from the tank, the contracted outlet 41 keeping the vessel full and down until the tank has discharged.

A float 45 is reciprocated by the rise and fall of liquid in the tank 37 and communicates its movement to a disk 46 adapted to oscillate on an axis 47, a cord 48 passing over the disk being connected to the stem 49 of the float and a counter weight 50 for the float. The oscillating disk 46 has fixed thereto a clip 51 which carries a usual form of ball clutch 52, the ball running freely in one direction on the face of the spur wheel 53 and gripping the wheel so as to turn it upon its axis 47 in the opposite direction. A stationary clip 54 carries a ball 55 which runs freely on the face of the spur wheel when the latter is advanced but grips it to prevent reverse movement. The spur wheel 53, thus revolved step by step at the rate of reciprocation of the float 45, operates the driving pinion 56 of a register 57 which indicates the total flow through the conduit.

The bucket 29 discharges through its orifice 30 into the funnel 58 and the waste pipe 59, and the bucket 40 discharges through its outlet 41 into the catch basin 60 and the waste pipe 61.

As shown in Figs. 3 and 4, the cam 15' and the weight 20 may be dispensed with by substituting for the float 12 a float 12' shaped as required to balance the vessel 14 at its various positions and depths of submergence in the vessel 17.

It will be understood that, in operation, when the flow in the conduit 1 has reached the maximum, the resultant effect of the pressures communicated through the tubes 5 and 8 has been to drive the heavier liquid from the reservoir 7 into the tube 11 and the reservoir 10, the float 12 or 12' falling to its lowest position and the vessel 14 rising to its highest position. As the rate of flow decreases, the float rises with the rise of the mercury in the hollow column 7 and the vessel 14 falls, the head which induces the flow through the orifice 18 varying therewith. At the time the heavier liquid and the float have risen to their highest point in the column 7, when there is no flow in the conduit 1, the bottom of the vessel 14 has reached the bottom of the vessel 17 when there is no flow through its orifice since the head is practically zero. The orifice 18 is positively closed in the lowest position of the vessel 14 by the stopper 60' on the bottom of the vessel 17.

It will be understood that, as shown in Fig. 5, my invention is adapted for indicating the flow of a liquid in an open channel 62, through a weir or over a dam. In such case a float 12'', connected with the cord 13, varies the position of the vessel 14 with variations in the level of the liquid, from which the flow may be indicated.

Having described my invention, I claim:—

1. A liquid meter comprising a vessel, a second vessel adapted to reciprocate therein, said second vessel having an outlet by which it discharges into said first vessel, means for maintaining a constant depth of liquid in said second vessel, and means for measuring the overflow from said first vessel.

2. A liquid meter comprising a stationary vessel having an overflow passage, a vessel movable in said stationary vessel and having an orifice discharging thereinto, means for maintaining a constant depth of liquid in said movable vessel, and means for varying the position of said movable vessel with variations in the pressure of a liquid to be measured.

3. A liquid meter comprising a stationary vessel having an overflow passage, a vessel movable in said stationary vessel and having an orifice discharging thereinto, means for measuring the overflow from said stationary vessel, a conduit, and means for varying the position of said movable vessel in said stationary vessel with variations in the pressure of a liquid in said conduit.

4. A liquid meter comprising barometric members containing a liquid heavier than that to be measured, means whereby the liquid to be measured communicates its pressure to and moves said heavier liquid, a float movable in one of said members with said heavier liquid, a vessel, balancing mechanism by which said float and vessel are connected so that the movement of the float moves the vessel, a second vessel in which said first vessel moves and into which it discharges, and means for maintaining said first vessel full.

5. A liquid meter comprising a pair of hollow columns having a passage connecting their bottoms, a float in one of said columns, a vessel having an orifice in the bottom thereof, balancing mechanism through which said float and vessel are connected, a second vessel in which said first vessel moves and into which it discharges through said orifice, and means for maintaining a constant liquid level in said first vessel.

6. In a liquid meter, a vessel, a valve for controlling the flow of a liquid to said vessel, and means for regulating the position of said valve, said means comprising a movable vessel and mechanism whereby said movable vessel is connected with and operates said valve.

7. In a liquid meter, a vessel having an orifice therein, a device connected with and conveying liquid to said vessel, a fulcrumed lever connected to said device, and a valve connected with said lever to control the flow of said liquid.

8. In a liquid meter, a vessel, means for balancing said vessel, a second vessel, means for balancing said second vessel, a valve operated by said second vessel through its balancing means for regulating the flow of a liquid to said first vessel, and means whereby the overflow from said first vessel is conveyed to said second vessel.

9. In a liquid meter, a stationary vessel, a vessel with an orifice in the bottom thereof movable in said stationary vessel, means for balancing said movable vessel, a valve for controlling the flow of a liquid into said movable vessel, a second movable vessel with an orifice in the bottom thereof, a balancing device connecting said valve with said second movable vessel, and means for conveying the overflow from said first to said second movable vessel.

10. In a liquid meter, a channel for a liquid to be measured, a liquid container having an orifice, means for varying the liquid head causing a flow through said orifice with variations in the flow in said channel, and means for automatically measuring the liquid discharged from said orifice.

11. In a liquid meter, a liquid container having an orifice, means for balancing said container, means for varying the position of said container and the liquid head inducing flow through said orifice, and means for automatically measuring the liquid discharged from said orifice.

In testimony whereof I have hereunto set my name this 27th day of February, 1907, in the presence of the subscribing witnesses.

JOHN W. LEDOUX.

Witnesses:
ROBERT JAMES EARLEY,
JOS. G. DENNY, Jr.